US010713361B2

(12) United States Patent
Strogov et al.

(10) Patent No.: US 10,713,361 B2
(45) Date of Patent: Jul. 14, 2020

(54) ANTI-MALWARE PROTECTION USING VOLUME FILTERS

(71) Applicant: Acronis International GmbH, Schaffhausen (CH)

(72) Inventors: Vladimir Strogov, Moscow (RU); Vyacheslav Levchenko, St. Petersburg (RU); Anatoly Stupak, Moscow (RU); Stanislav Protasov, Moscow (RU); Mark Shmulevich, Moscow (RU); Serguei Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 145 days.

(21) Appl. No.: 15/619,609

(22) Filed: Jun. 12, 2017

(65) Prior Publication Data
US 2018/0357133 A1 Dec. 13, 2018

(51) Int. Cl.
*G06F 11/14* (2006.01)
*G06F 21/56* (2013.01)
*G06F 21/80* (2013.01)

(52) U.S. Cl.
CPC ........ *G06F 21/566* (2013.01); *G06F 11/1451* (2013.01); *G06F 21/80* (2013.01); *G06F 11/1469* (2013.01)

(58) Field of Classification Search
CPC ............ G06F 11/1458; G06F 11/3003; G06F 21/568; G06F 21/554; G06F 11/1451; G06F 21/566; G06F 21/80; G06F 11/1469
See application file for complete search history.

(56) References Cited

U.S. PATENT DOCUMENTS

| | | | | |
|---|---|---|---|---|
| 7,284,104 | B1* | 10/2007 | Wu | G06F 11/1451 707/999.202 |
| 7,478,101 | B1* | 1/2009 | Manley | G06F 11/1451 |
| 9,171,002 | B1* | 10/2015 | Mam | G06F 17/30091 |
| 2004/0221125 | A1* | 11/2004 | Ananthanarayanan | G06F 3/0613 711/203 |
| 2008/0086513 | A1* | 4/2008 | O'Brien | G06F 21/554 |
| 2018/0232165 | A1* | 8/2018 | Kusters | G06F 3/0619 |

* cited by examiner

*Primary Examiner* — Meng Li
(74) *Attorney, Agent, or Firm* — Arent Fox LLP; Michael Fainberg (57) ABSTRACT

Disclosed are systems and methods for protecting a computer system from ransomware and malware by copying and backing up files using a volume filter. A storage stack of the computer system includes a file protector driver and a volume filter driver. The file protector driver monitors for potentially dangerous actions to the system's files. The volume filter driver tracks any requested changes to files on a block level, and makes backup copies of the modified blocks when the blocks change on a block level of the storage device.

21 Claims, 6 Drawing Sheets

ANTI-MALWARE PROTECTION USING VOLUME FILTERS

FIELD OF TECHNOLOGY

The present disclosure relates generally to the field of archiving and copying of data, more specifically, creating backup files and snapshots using a volume filter drive.

BACKGROUND

Typically, an operating system of a computer system includes a file system to provide users with an interface while working with data on the computer system's disk and to provide the shared use of files by several users and processes. Generally, the term "file system" (or "filesystem" interchangeably) encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device.

One issue that affects the operations of computer systems and file systems in particular is the prevalence of malicious software. Malicious software, also referred to as "malware," can infiltrate or damage a computer system by corrupting software code, resulting in abnormal operation or even termination of applications and the operating system. One type of malware known as "ransomware" takes block access to data on a computer system until a ransom is paid. Ransomware typically uses cryptography techniques to encrypt a computer system's files (such as a computer's Master File Table or the entire hard drive), thereby making them inaccessible until decrypted upon payment of the ransom. Ransomware can alter the file system in other ways, for example, by hiding the files, modifying the access rights of the files, moving the files to a hidden location in the file system, scrambling the names of files, or some combination thereof.

Known approaches for protecting a computer system against ransomware and other malware generally involve periodic data archiving and protection in case malicious programs are detected attempting to alter the file system. One of these approaches is a backup of the entire hard drive, which typically involves copying of the hard drive contents onto some other medium (such as another hard disk drive, a DVD ROM, a DVD RAM, a flash disk, etc.). Another approach is to proactively back up files or create file snapshots whenever a suspicious program attempts to make changes to user files. These known approaches have several disadvantages, including high demands on the computer's CPU, memory, and storage resources that must be diverted from use with other tasks to perform constant backups of files.

SUMMARY

Thus, a system and method is disclosed herein for protecting against malware, and, more particularly, for creating backup files using a volume filter to protect against malware.

In one exemplary aspect, a method for protecting a computer system from ransomware and malware by copying and backing up files using a volume filter is provided. The method includes receiving a file modification request for a first file of a plurality of files stored in a storage device. The file modification request may be issued by a process executing in an operating system environment. The method further includes retrieving a file allocation map associated with the storage device. The file allocation map indicates locations of the plurality of files by respective logical clusters in the storage device. The method includes, responsive to detecting that the process is an untrusted process, tracking changes to one or more blocks of the first file requested by the file modification request and using the file allocation map. The method includes, responsive to detecting the one or more blocks of the first file have been changed at a block level of the storage device, generating a backup of the first file comprised of copies of the one or more blocks of the first file.

In another aspect, wherein generating the backup of the first file comprised of copies of the one or more blocks of the first file further comprises creating the copies of the changed blocks of the first file and not of all blocks of the first file.

In another aspect, wherein generating the backup of the first file is performed by copying the one or more blocks of the first file using a copy-on-write operation.

In another aspect, the method includes, responsive to receiving a request to restore the first file using the backup: retrieving a first portion of the first file comprised of unmodified storage blocks from respective original locations in the storage device; and retrieving a remainder of the first file comprised of copied blocks from the backup corresponding to changed blocks of the first file.

In another aspect, the file modification request for the first file includes at least one of a request to delete the first file, overwrite the first file, and truncate the first file.

In another aspect, the generated backup of the first file comprised of copies of the one or more blocks of the first file are stored in a generalized free space in the storage device.

In another aspect, the method includes, responsive to detecting the one or more blocks of the first file have not been changed at the block level of the storage device, refraining from copying the one or more blocks of the first file and designating the blocks of the first file as the backup of the first file.

According to one aspect, a system for protecting a computer system from ransomware and malware by copying and backing up files using a volume filter is provided. The system includes a storage device configured to store a plurality of files including a first file, and a processor. The processor is configured to receive a file modification request for the first file, and retrieve a file allocation map associated with the storage device. The file modification request is issued by a process executing in an operating system environment, and the file allocation map indicates locations of the plurality of files by respective logical clusters in the storage device. The processor is further configured to, responsive to detecting that the process is an untrusted process, track changes to one or more blocks of the first file requested by the file modification request and using the file allocation map. The processor is configured to, responsive to detecting the one or more blocks of the first file have been changed at a block level of the storage device, generate a backup of the first file comprised of copies of the one or more blocks of the first file.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method, and computer program product for protecting a computer system from ransomware and malware by copying and backing up files using a volume filter. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
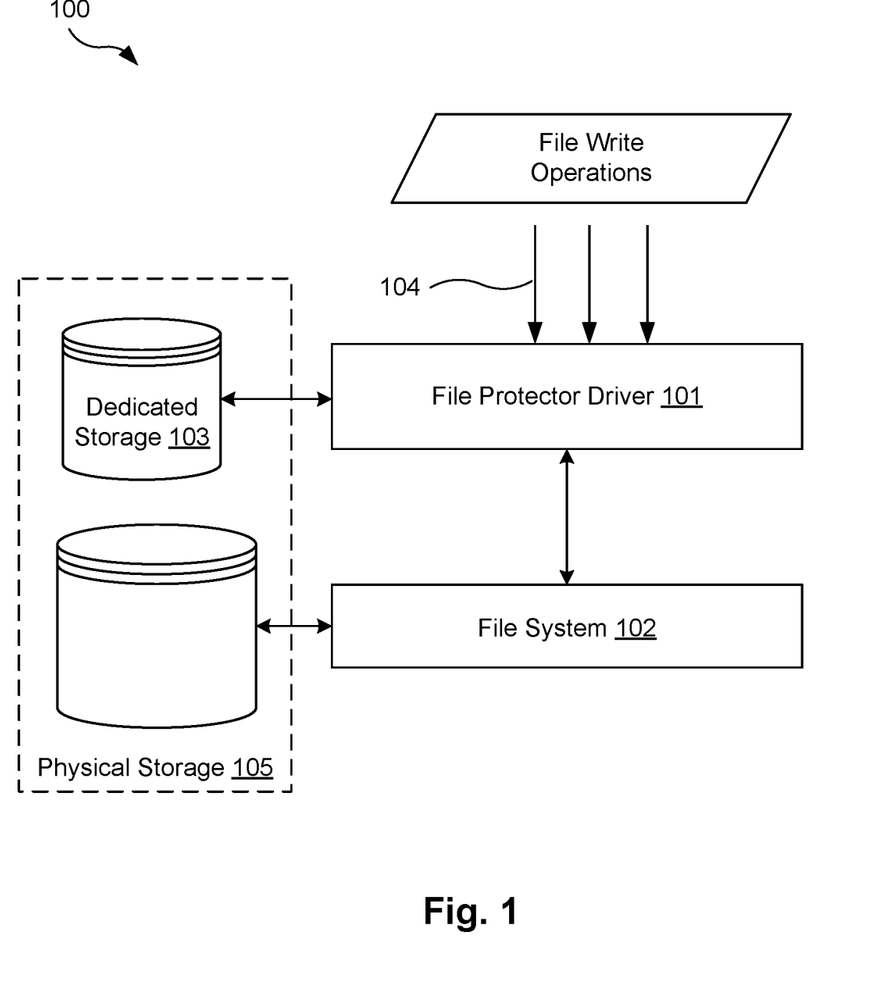
FIG. 1 illustrates a block diagram of a system for creating backup files using preventative snapshots.

One technique for protecting system data from malicious programs, such as ransomware, is to quickly "preventatively" back up a file or create a snapshot of the file in case of detection of any suspicious process that tries to make changes to this file. FIG. 1 illustrates a block diagram of a system 100 for creating back up files using preventative snapshots. As shown, data files are recorded on the file system 102 and physically stored in one or more storage devices, represented by physical storage 105.

In order to prevent file encryption or other changes by malicious programs (e.g., ransomware), the system can install a special file filter driver, or a file protector driver 101, that monitors all processes that attempt to make changes to the user files. For example, the file protector driver 101 may detect any modification requests 104 to a file, including requests to delete, overwrite, or truncate a file. If such requests 104 are detected, the file protector driver 101 can identify the process that executes such a requests. If the process is not trusted, the file protector driver 101 may execute a copy-on-write snapshot of the file, thereby saving the file version before modification by the request. File snapshots are placed in a dedicated file storage 103, which is an allocated part of the computer's hard disk drive storage. Subsequently, in the event that the user files were corrupted (i.e., encrypted) or deleted, the original version of the file can be extracted from the file storage 103 to allow access to the contents of the file.

However, it has been determined that this approach may suffer from a number of drawbacks. First, the technique of constantly creating snapshots of files can be demanding on the resources of disk memory, since full copies of the protected files are created. Any suspicious requests for modification of the file might initiate the creation of its copy (snapshot). If the amount of dedicated storage 103 allocated for snapshots becomes insufficient, then the file protector driver 101 might prematurely halt its backup activity, as there is nowhere to back up the files. Secondly, creating multitudes of snapshots can be similarly demanding on the computing resources of the computer. Snapshot creation creates a significant load on the processor of the computer, thereby appropriating resources needed for other tasks. Next, the file copying to file storage 103 is performed at any potential modification danger, even though the file may not in reality be modified. This creates an additional load on the resources of the computer and on the storage space allocated for snapshot storage 103. Accordingly, an improved technique for backing up files in danger from malicious programs is described below in conjunction with FIG. 2.

Figure 2:
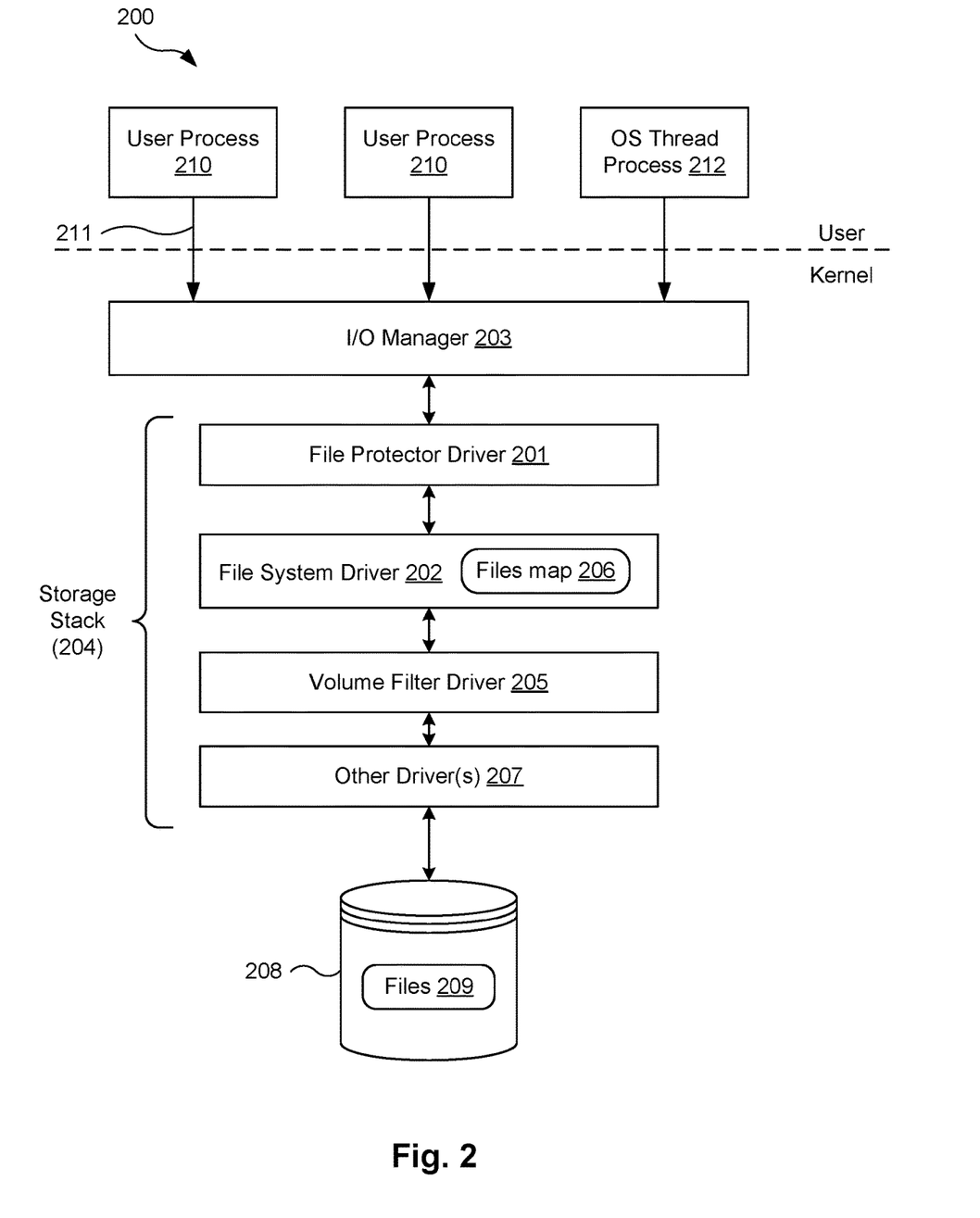
FIG. 2 illustrates a block diagram of a system for protecting a computer system from ransomware and malware by copying and backing up files using a volume filter according to an exemplary aspect.

FIG. 2 illustrates a block diagram of a system 200 for protecting a computer system from ransomware and malware by copying and backing up files using a volume filter according to an exemplary aspect. The system 200 includes a data storage device 208 that may be accessed by one or more user processes 210 or operating system (OS) thread processes 212 via a file system 202. The system 200 supports execution of one or more user processes 210 executing an operating system (OS) environment having a file system driver 202. Also, one or more OS thread processes 212 may be executed in parallel with the user processes 210. Such processes 210, 212 can modify data represented on a data storage device 208 via the file system driver 202.

User processes 210 and OS thread processes 212 may request to read and write data to the data storage 208 via a file system request 211. This request 211 may be directed to an I/O manager 203 for initial processing. The request 211 is then transmitted for execution to a storage stack 204 of the operating system. Various components in the storage stack 204 subsequently perform the requested operation on the selected data located in the data storage 208.

The I/O manager 203 is configured to manage all input and output for the operating system. The I/O manager 203 supports all file system drivers, hardware device drivers, and network drivers. The I/O manager 203 provides a common interface to all drivers, such as the file system driver 202. This allows the I/O manager 203 to communicate with all drivers in the same way, without actually any knowledge of how the devices they control actually work.

The I/O manager 203 may process a file system request and transmit file system requests 211 to relevant components of a storage stack 204 of the operating system. The storage stack 204 is comprised of a plurality of system drivers, some working at the level of a system volume, that handle processing of the file system requests 211 in a certain order. In one exemplary aspect, the storage stack 204 includes a file protector driver 201, a file system driver 202, a volume filter driver 205, and other drivers 207. The other drivers 207 may include partition mangers, class drivers, MPIO (multi-path I/O) drivers, port drivers, and device drivers that handle communication to corresponding devices such as I/O ports, main data storage, and temporary data storage, flash drives, hard drives, etc. While the storage stack 204 of FIG. 2 is based on a storage architecture found in Microsoft Windows®-based computing platforms, it is understood that exemplary aspects of the present disclosure may be extended to other corresponding components in other operating system (e.g., macOS®, Linux®, etc.)

The file protector driver 201 may be configured to monitor potentially dangerous actions with respect to user files stored in data storage 208. In some exemplary aspects, the file protector driver 201 may check activity by OS processes against databases of trusted software and malicious software components. Names or other identifying characteristics of a particular process of a software component, such as fingerprints, signatures, control sums, or CRCs, can then be compared with a database of such information for ransomware and other types of malware. The malware database and their identifying characteristics can be obtained from many antivirus vendors, or can be generated independently.

The file system driver 202 is configured to service a file system that controls how data is stored and retrieved in storage 208. The file system defines where in the data storage the relevant data blocks of a file are located. The file system typically interacts with storage 208 at the level of blocks. For example, read and write operations are performed in connection with data areas that have sizes divisible by the size of one block. The sequence of the blocks in the storage 208 is ordered and each block has its own number. The computer system 200 may include several such storages and the file system may take only a portion of one such storage, the whole storage, or several such storages or their parts. On the disk or storage device, these type of storages are usually located in partitions, taking the entire partition. The file system may be subdivided into several categories, including the housekeeping data of the file system volume, file metadata, file data, and free space not occupied by the other data.

In some exemplary aspects, the file system driver 202 is configured to provide a mapping between files and directories formatted in a file system to logical blocks of data stored in data storage 208. The file system driver 202 may maintain a file allocation map 206, which is a map of the location of files in data storage 208 (e.g., by disk logical clusters). The file allocation map 206 can specify the storage-level locations in storage that contain file data for a particular file. For example, the file allocation map 206 may list the logical block addresses (LBAs) from a GUID partition table of data storage 208. In some exemplary aspects, the file system driver 202 may provide a file system formatted according to the NTFS format made available by Microsoft®. It is understood that aspects of the present disclosure may be applied to other file systems, such as FAT, HFS+, ext3, ext4, and to other storage stack architectures.

In one exemplary aspect, the volume filter driver 205 may be configured to track changes to files 209 in the data storage 208 on the block level. The volume filter driver 205 may be configured to detect when changes by a file request are made on a block level of the storage 208. At such times, the volume filter driver 205 is configured to generate a backup file by copying original values of the changed sectors to free space within data storage 208 according to a copy-on-write (COW) operation. In a copy-on-write operation, when the modification request is made, the original data may be copied into a new storage area, and then the original data block is modified.

In some exemplary aspects, the file protector driver 201 and volume filter driver 205 can be implemented as filesystem filter drivers. Filesystem filter drivers are kernel-mode components that run as part of the operating system. Filesystem filter drivers may be configured to extend functionality of or modify the behavior of a file system. A filesystem filter driver can filter I/O operations for one or more file systems or file system volumes. An I/O operation in a file request can be processed by different filesystem filter drivers in a particular sequence (e.g., an order as defined by the storage stack 204). In some exemplary aspects, the file protector driver 201 and volume filter driver 205 may be attached to one or more mounted volumes of the storage 208 that has been designated (e.g., by an administrator) for protection from malware and ransomware, and filters all I/O operations on them. In another exemplary aspect, the volume filter driver 205 may be implemented as a client of a volume/disk filter manager that acts on its behalf within the filesystem filter driver.

During operation, the file protector driver 201 may make a request to the file system driver 202 and receives a file allocation map 206 at the level of the disk clusters. Then, the file protector driver 201 forwards the files map 206 to the volume filter driver 205. In cases of attempts to modify files (e.g., delete, overwrite, truncate), the volume filter driver 205 tracks these changes at the block level. The entire file is not copied. The volume filter driver 205 makes backup copies of the modified blocks of the files only when the blocks change (e.g., using a copy-on-write operation). In this case, the actual copying of the modifiable block occurs only if its modification is done at the block level (e.g., on the disk), so that the data can be actually deleted. In other cases, when a file is deleted, blocks on the volume that were used by the file are simply marked free, but are not overwritten immediately. In the case that the sector is still physically stored on the disk (i.e., it is only deleted at the logical level), the sector is not copied, but rather its contents already written to the disk are used as the backup. This avoids unnecessary copy and write operations to data storage 208, thereby reducing waste of computing resources. If it is necessary to restore the file, its unmodified sectors are taken from where they were before, and the changed sectors are taken from the previously made copies of these sectors in order to completely restore the original content of the file.

Accordingly, aspects of the present disclosure are able to protect the system from malicious programs, such as ransomware, with the use of volume filter driver 205. The volume filter driver 205 allows the system to copy files that are modified (i.e., encrypted) not just in their entirety, but only those sectors in them that have been modified. Unchanged sectors can remain where and what they were originally. Certain aspects of the present disclosure also refrain from "preventatively" performing the copy operation on the contents of the file, but rather at the time when the actual modification of the file occurs. This avoids unnecessary disk activity of the protection system since not every access to the file by any process necessarily leads to modification of the file. While in prior approaches, a full copy of deleted file was immediately put in the storage, certain aspects of the present disclosure save the file allocation map on deletion and overwritten blocks of deleted file are saved in the storage. Certain aspects of the present disclosure also allow the use of any storage resources in the system 200 to store contents (snapshots) of the files, not just a dedicated, specifically allocated portion of storage. The volume filter driver 205 allows the system to save file data on any unallocated disk space, any partition, any network resources, any unformatted disk space, or even using sparse files. This storage flexibility allows the system to significantly expand the amount of disk space that can be used to back up file versions compared to conventional techniques.

Figure 3:
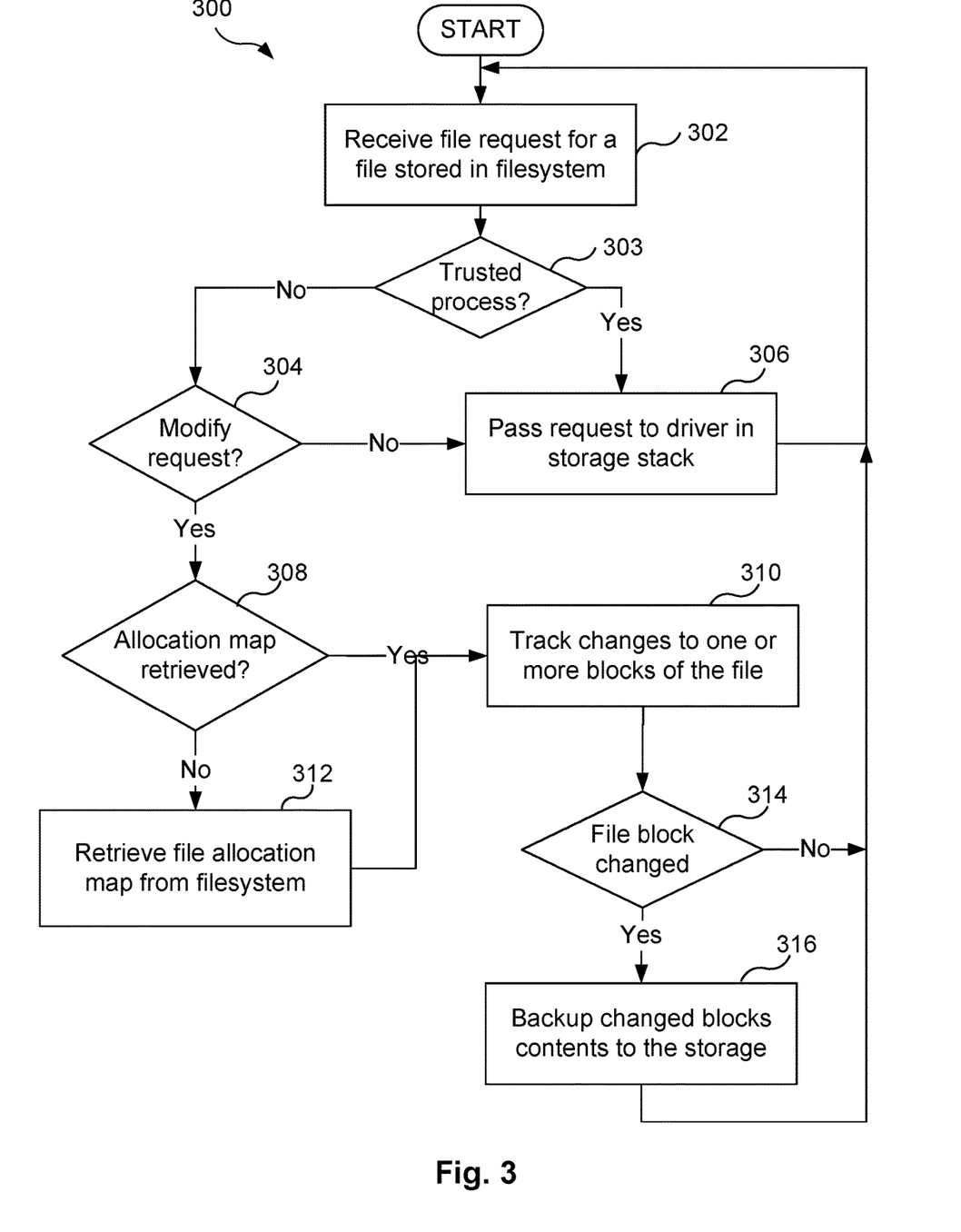
FIG. 3 illustrates a flowchart of a method for protecting a computer system from ransomware and malware by copying and backing up files using a volume filter according to an exemplary aspect.

FIG. 3 illustrates a flowchart of a method 300 for protecting a computer system from ransomware and malware by copying and backing up files using a volume filter according to an exemplary aspect. It is noted that the following description of the exemplary method refers to the system and components described above.

The method 300 begins at step 302, where the I/O manager 203 receives a file access request (e.g., request 211) to perform an I/O operation on any tracked or protected file (i.e., a first file of a plurality of files 209) in a storage device (e.g., data storage 208). The file access request 211 is issued by a process executing in an operating system environment, such as user processes 210 or OS thread processes 212. The I/O manager 203 may forward the file access request to the storage stack 204, namely, to the file protector driver 201 at the highest position within the stack.

In one exemplary aspect, when a user process 210 makes a request to a data storage 208 with multiple drivers on its storage stack 204, the I/O manager 203 first sends an I/O request packet (IRP) to the highest-level driver in the stack. In one implementation, an IRP may be a kernel-mode data structure associated with the storage stack 204 that stores the request's function codes as well as its arguments. Rather than pass a large number of small arguments (e.g., buffer address, buffer size, I/O function type, etc.) to a driver, all of these parameters are passed via a pointer to this persistent data structure. The IRP may further include other intermediate data, results, and status, picked up along the way of its processing by drivers within the storage stack 204. It is noted that an IRP is a concept and terminology used in the Windows® operating system. Exemplary aspects of the present disclosure can be extended to equivalent concepts found in other suitable operating systems.

At step 303, the file protector driver 201 determines whether the file access request 211 was issued by a trusted process. The file protector driver 201 may identify the process that issued the request 211 and check the identified process against a database of pre-determined trusted processes. In some exemplary aspects, the file protector driver 201 may check the identified process against a database of known malicious processes.

At step 306, responsive to determining that the request was from a trusted process (i.e., the "Yes" branch of step 303), the file protector driver 201 may pass the request 211 to a lower driver within the storage stack 204 for further processing. For example, the file protector driver 201 may pass the request 211 to the file system driver 202 and other drivers 207 including device drivers and storage drivers, which in turn can fulfill the file access request 211 with the data storage 208. Operations may return to step 302, in which the I/O manager 203 waits for receipt of more file requests.

At step 304, responsive to determining that the request is from an untrusted process (i.e., the "No" branch of step 303), the file protector driver 201 may check whether the file access request 211 is a file modification request. If the file access request is a read request ("No" branch of step 304), the file protector driver 201 passes the file access request 211 to lower drivers within the storage stack 204 for further processing (step 306). For the purposes of the described technique, the file protector driver 201 may treat any type of file access requests 211 that do not modify the underlying file data as a read request. This includes both explicit requests to read data from storage, as well as requests to obtain metadata about a file or file handle. In some implementations, the type of a file access request can be identified based on an IRP function code or other metadata contained in the request 211 that represents a type of read operation (e.g., IRP_MJ_READ, IRP_MJ_QUERY_INFORMATION).

In some cases, the file protector driver 201 may determine that the file access request 211 is a file modification request for a first file of a plurality of files 209 stored in a storage device (e.g., data storage 208). In some exemplary aspects, the file modification request for the first file may be a request to delete the first file, to overwrite certain blocks of the first file with some provided data, a request to create a file with overwrite enabled, a request to truncate the first file, a request to create a link to the first file and replace if the file exists, a request for memory map with write access, or a request to make other changes to the first file. The file modification request may be indicated by a function code (e.g., IRP_MJ_WRITE) representing a type of file operation that changes one or more data blocks of the first file.

At step 308, responsive to determining receipt of a file modification request ("Yes" branch of step 304), the file protector driver 201 checks for the availability of an already retrieved allocation map (e.g., map 206). If not available, at step 312, the file protector driver 201 retrieves a file allocation map (e.g., map 206) associated with the storage device from the file system driver 202. The file allocation map indicates locations of the plurality of files by respective logical clusters in the storage device. The file protector driver 201 passes the file allocation map to the volume filter driver 205, along with the file request 211.

At step 310, the volume filter driver 205 tracks changes to blocks of the first file requested by the file modification request 211 and using the file allocation map 206. It is noted that the tracking of changes to the first file may be performed responsive to detecting that the process is an untrusted process. If the process was determined to be a trusted process, the modification request may be passed down the storage stack 204 and processed accordingly without need to check or backup the first file.

At step 314, the volume filter driver 205 detects when the blocks of the first file have been changed at a block level of the storage device. In some exemplary aspects, the volume filter driver 205 may register a completion routine and passes the request 211 to other drivers 207 to complete processing of the file modification request. The completion routine may be registered by setting a transfer address in the request itself (e.g., via an IoSetCompletionRoutine( ) library function). The completion is then called when the lower-level drivers (e.g., other drivers 207) finish processing the request. The volume filter driver 205 can use this callback technique to post-process the data returned by the lower-level drivers, i.e., by generating a backup copy of the changed file as described below. In other exemplary aspects, the volume filter driver 205 may register with the operating system to be notified just prior to the changes of the blocks of the first file being made at the block level of the storage device, e.g., as a system event.

At step 316, responsive to detecting the blocks of the first file have been changed at the block level of the storage device, the volume filter driver 205 generates a backup of the first file comprised of copies of the blocks of the first file. In some exemplary aspects, the volume filter driver 205 may create the copies of the changed blocks of the first file (i.e., blocks that will be changed by the file modification request 211), and not of all blocks of the first file. The volume filter driver 205 creates a backup not of the entire file but only those sectors in the files that have been modified. Unchanged sectors of the block remain where they were originally.

In some exemplary aspects, the volume filter driver 205 may generate the backup of the first file by copying the one or more blocks of the first file using a copy-on-write operation. In one implementation, the volume filter driver 205 may perform the COW operation prior to passing the IRP down the storage stack. In some exemplary aspects, the volume filter driver 205 stores the backup of the first in a generalized free space in the storage device 208, rather than in a portion dedicated only to file snapshots. This enables the volume filter driver 205 to use any unallocated disk space in the data storage 208, including any partitions, even on a network storage resource (e.g., SAN, NAS), and so forth.

Responsive to detecting the blocks of the first file have not actually been made at the block level of the storage, ("No" branch of step 314), the volume filter driver 205 may refrain from copying the data blocks of the first file and designates the blocks of the first file as the backup itself. For example, a process issues a file modification request to delete a target file. The volume filter driver 205 determines that the file is only deleted at the logical level of the file system. The sectors of the file remain physically stored on the disk. The volume filter driver 205 does not copy the sectors again, but rather uses the contents already written to the disk as the backup.

At some subsequent time, it may be necessary to restore a file in storage 208. For example, a malicious program (e.g., ransomware) may have corrupted or encrypted one or more files 209. Responsive to receiving a request to restore the first file using the backup, the file protector driver 201 and/or the volume filter driver 205 may retrieve a first portion of the first file comprised of unmodified storage blocks from respective original locations in the storage device. Then the drivers may retrieve a remainder of the first file comprised of copied blocks from the backup corresponding to changed blocks of the first file.

Figure 4A:
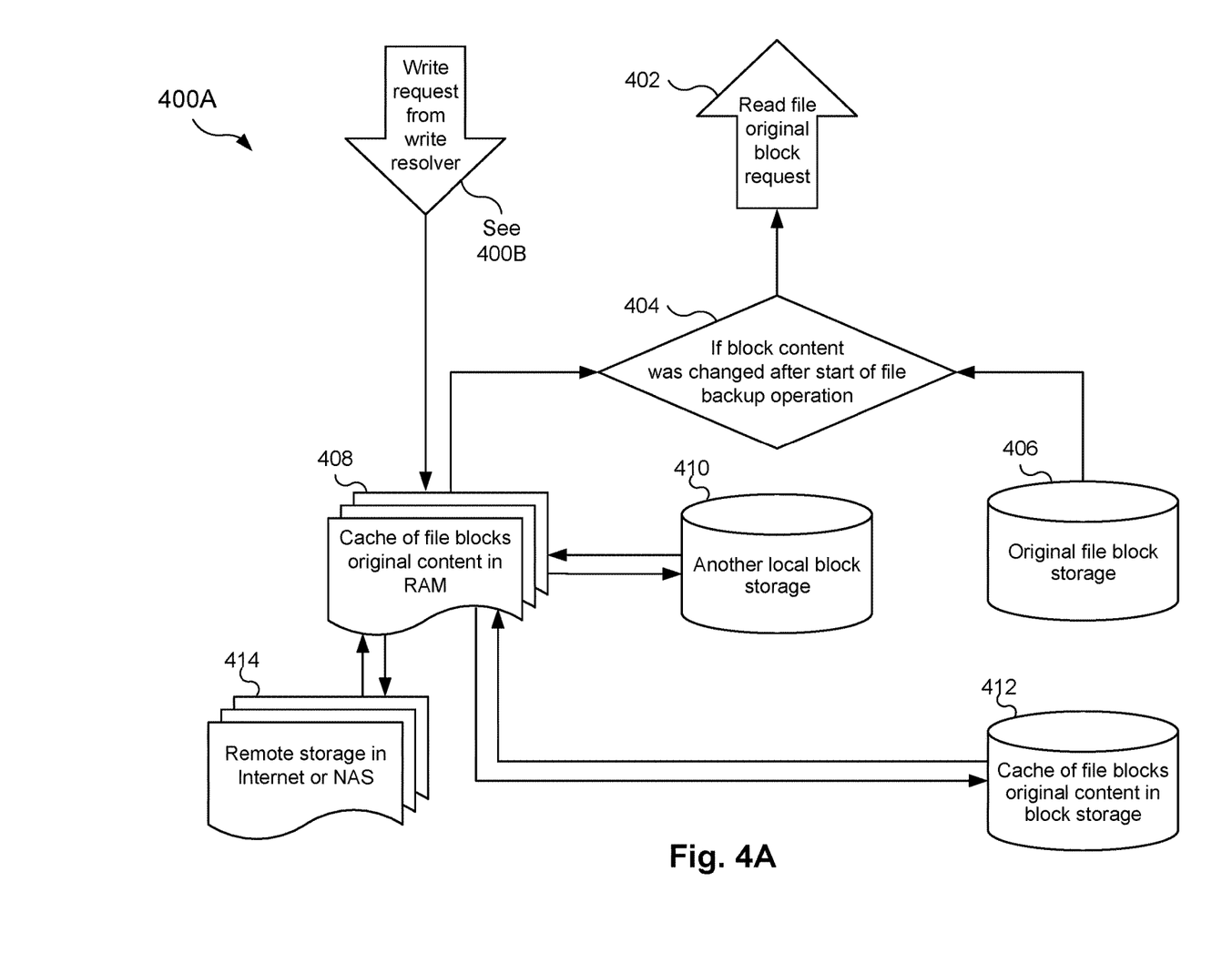
FIG. 4A illustrates a flowchart of operations of a file image backup reader workflow according to an exemplary aspect.

FIG. 4A illustrates a flowchart of operations 400A of a file image backup reader workflow according to an exemplary aspect. As shown, the operations 400A begin at block 402, in which the volume filter driver 205 receives a file access request to read the original file blocks of a file. If the block content is unchanged, the volume filter driver 205 can retrieve the file from the original file block storage (block 406). At block 404, if the block content was changed after start of the file backup operation, the volume filter driver 205 retrieves portions of the file from the original file block storage (block 406) and other portions from a cache of file blocks original content stored in RAM (block 408). In some cases, the cache of file blocks original content in RAM can retrieve file blocks from other sources, including another local block storage (block 410), cache of file blocks original content in block storage (block 412), or even in remote storage in the Internet or a network storage (e.g., NAS) (block 414).

Figure 4B:
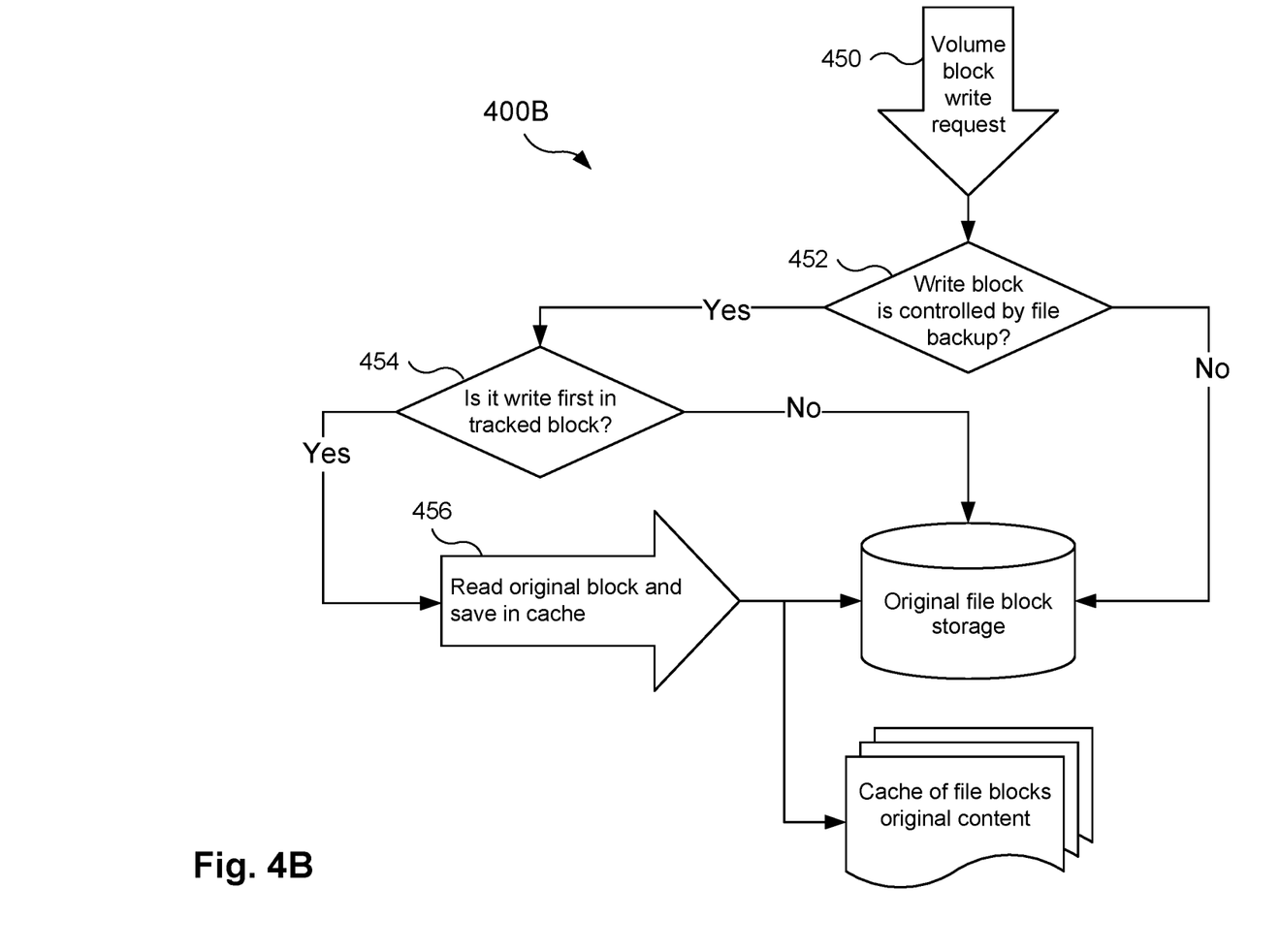
FIG. 4B illustrates a flowchart of operations of an instant file backup copy-on-write resolver according to an exemplary aspect.

FIG. 4B illustrates a flowchart of operations 400B of a file backup copy-on-write resolver according to an exemplary aspect. As shown, at block 450, the volume filter driver 205 may receive a write request for one or more logical volume blocks. At block 452, the volume filter driver may determine whether the write block is controlled by the file backup process. If not, the volume filter driver may simply service the write request using the original file block storage (i.e., "No" branch of block 452). Responsive to determining that the write block is controlled by the file backup process (i.e., "Yes" branch of block 452), the volume filter driver checks whether it is appropriate to write first in the tracked block, at block 454. If so, at block 456, the volume filter driver reads the original file block from the original file block storage and saves the block in the cache of file blocks original content. Otherwise, the volume filter driver services the write request using the original file block storage.

Figure 5:
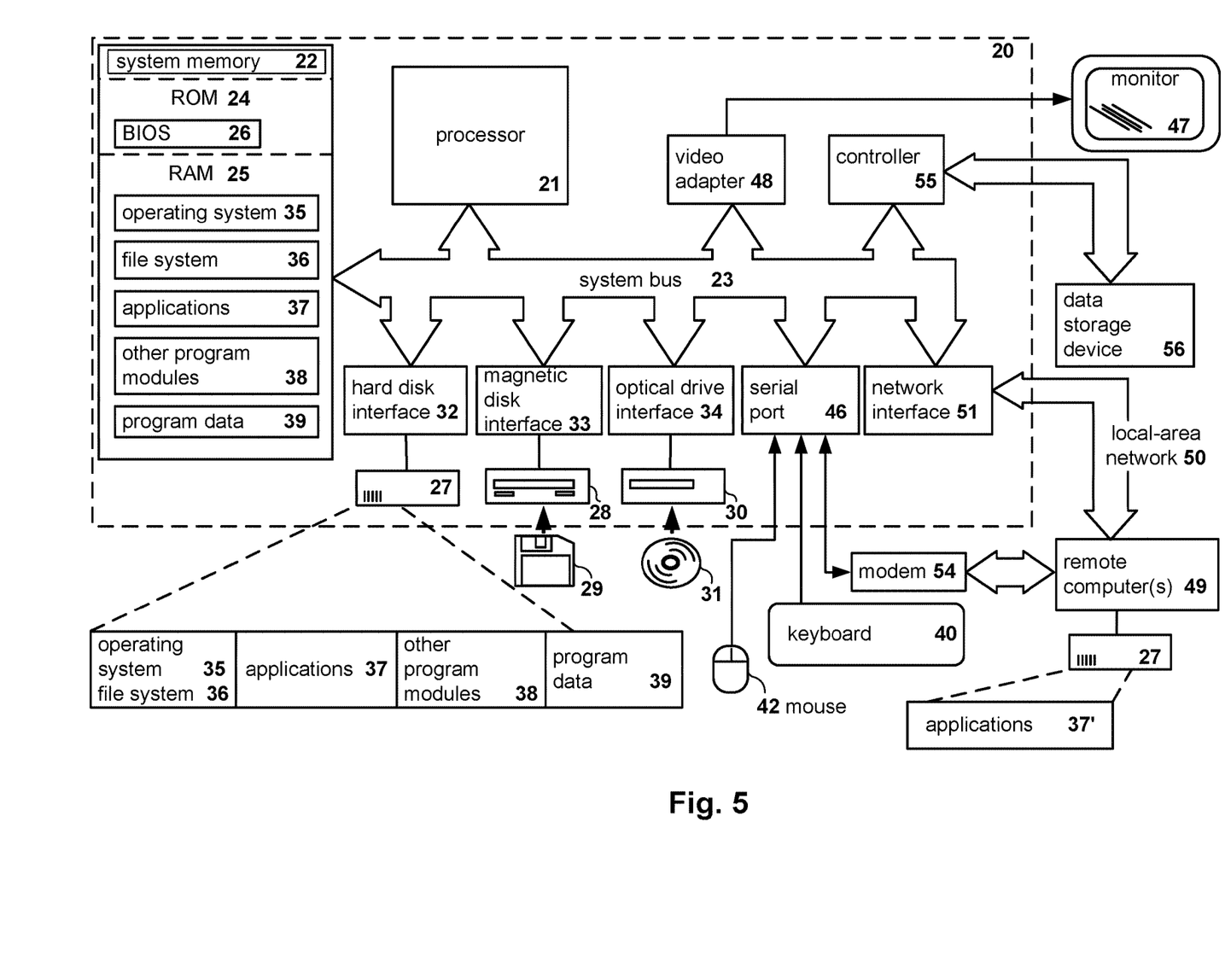
FIG. 5 illustrates a block diagram of a general-purpose computer system on which the disclosed system and method can be implemented according to an exemplary aspect.

FIG. 5 is a diagram illustrating a general-purpose computer system 20 on which aspects of systems and methods for protecting a computer system from ransomware and malware by copying and backing up files using a volume filter may be implemented in accordance with an exemplary aspect. It should be noted that the computer system 20 can correspond to the systems 100, 200 described above, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20 may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33, and the optical drive interface 34, respectively. The drives and the corresponding computer information media are power-independent modules for storage of computer instructions, data structures, program modules, and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35 may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for protecting a computer system from ransomware and malware by copying and backing up files using a volume filter, wherein the method comprises:
    receiving a file modification request for a first file of a plurality of files stored in a storage device, wherein the file modification request is issued by a process executing in an operating system environment;
    retrieving a file allocation map associated with the storage device, wherein the file allocation map indicates locations of the plurality of files by respective logical clusters in the storage device;
    responsive to detecting that the process is an untrusted process, tracking changes to one or more blocks of the first file requested by the file modification request and using the file allocation map;
    when changes to the one or more blocks of the first file are detected at a block level of the storage device, generating by the volume filter a backup of the one or more blocks of the first file, wherein the backup comprises a version of the one or more blocks prior to being changed by the file modification request; and writing the changes at the one or more blocks.

2. The method of claim 1, wherein generating the backup of the one or more blocks of the first file further comprises not creating, by the volume filter, copies of blocks of the first file that will not be changed at the block level by the file modification request.

3. The method of claim 1, wherein generating the backup is performed by copying the one or more blocks of the first file using a copy-on-write operation.

4. The method of claim 1, further comprising:
responsive to receiving a request to restore a pre-modified version of the first file using the backup:
retrieving a first portion of the first file comprised of unmodified storage blocks from respective original locations in the storage device; and
retrieving a remainder of the first file comprised of copied blocks from the backup corresponding to changed blocks of the first file.

5. The method of claim 1, wherein the file modification request for the first file includes at least one of a request to delete the first file, overwrite the first file, and truncate the first file.

6. The method of claim 1, wherein the generated backup of the one or more blocks of the first file are stored in a generalized free space in the storage device.

7. The method of claim 1, further comprising:
responsive to detecting the one or more blocks of the first file have not been changed at the block level of the storage device, refraining from copying the one or more blocks of the first file and designating the one or more blocks of the first file as the backup of the first file.

8. A system for protecting a computer system from ransomware and malware by copying and backing up files using a volume filter, wherein the system comprises:
a storage device configured to store a plurality of files including a first file; and
a processor configured to:
receive a file modification request for the first file, wherein the file modification request is issued by a process executing in an operating system environment;
retrieve a file allocation map associated with the storage device, wherein the file allocation map indicates locations of the plurality of files by respective logical clusters in the storage device;
responsive to detecting that the process is an untrusted process, track changes to one or more blocks of the first file requested by the file modification request and using the file allocation map;
when changes to the one or more blocks of the first file are detected at a block level of the storage device, generate by the volume filter a backup of the one or more blocks of the first file, wherein the backup comprises a version of the one or more blocks prior to being changed by the file modification request; and
write the changes at the one or more blocks.

9. The system of claim 8, wherein generating the backup of the one or more blocks of the first file further comprises not creating, by the volume filter, copies of blocks of the first file that will not be changed at the block level by the file modification request.

10. The system of claim 8, wherein generating the backup is performed by copying the one or more blocks of the first file using a copy-on-write operation.

11. The system of claim 8, wherein the processor is further configured to:
responsive to receiving a request to restore a pre-modified version of the first file using the backup:
retrieve a first portion of the first file comprised of unmodified storage blocks from respective original locations in the storage device; and
retrieve a remainder of the first file comprised of copied blocks from the backup corresponding to changed blocks of the first file.

12. The system of claim 8, wherein the file modification request for the first file includes at least one of a request to delete the first file, overwrite the first file, and truncate the first file.

13. The system of claim 8, wherein the generated backup of the one or more blocks of the first file are stored in a generalized free space in the storage device.

14. The system of claim 8, wherein the processor is further configured to:
responsive to detecting the one or more blocks of the first file have not been changed at the block level of the storage device, refrain from copying the one or more blocks of the first file and designate the one or more blocks of the first file as the backup of the first file.

15. A non-transitory computer readable medium comprising computer executable instructions for protecting a computer system from ransomware and malware by copying and backing up files using a volume filter, including instructions for:
receiving a file modification request for a first file of a plurality of files stored in a storage device, wherein the file modification request is issued by a process executing in an operating system environment;
retrieving a file allocation map associated with the storage device, wherein the file allocation map indicates locations of the plurality of files by respective logical clusters in the storage device;
responsive to detecting that the process is an untrusted process, tracking changes to one or more blocks of the first file requested by the file modification request and using the file allocation map;
when changes to the one or more blocks of the first file are detected at a block level of the storage device, generating by the volume filter a backup of the one or more blocks of the first file, wherein the backup comprises a version of the one or more blocks prior to being changed by the file modification request; and
writing the changes at the one or more blocks.

16. The non-transitory computer readable medium of claim 15, wherein generating the backup of the one or more blocks of the first file further comprises not creating, by the volume filter, copies of blocks of the first file that will not be changed at the block level by the file modification request.

17. The non-transitory computer readable medium of claim 15, wherein generating the backup is performed by copying the one or more blocks of the first file using a copy-on-write operation.

18. The non-transitory computer readable medium of claim 15, wherein the instructions further include instructions for:
responsive to receiving a request to restore a pre-modified version of the first file using the backup:

retrieving a first portion of the first file comprised of unmodified storage blocks from respective original locations in the storage device; and retrieving a remainder of the first file comprised of copied blocks from the backup corresponding to changed blocks of the first file.

19. The non-transitory computer readable medium of claim 15, wherein the file modification request for the first file includes at least one of a request to delete the first file, overwrite the first file, and truncate the first file.

20. The non-transitory computer readable medium of claim 15, wherein the generated backup of the one or more blocks of the first file are stored in a generalized free space in the storage device.

21. The non-transitory computer readable medium of claim 15, wherein the instructions further include instructions for:

responsive to detecting the one or more blocks of the first file have not been changed at the block level of the storage device, refraining from copying the one or more blocks of the first file and designating the one or more blocks of the first file as the backup of the first file.

\* \* \* \* \*